UNITED STATES PATENT OFFICE.

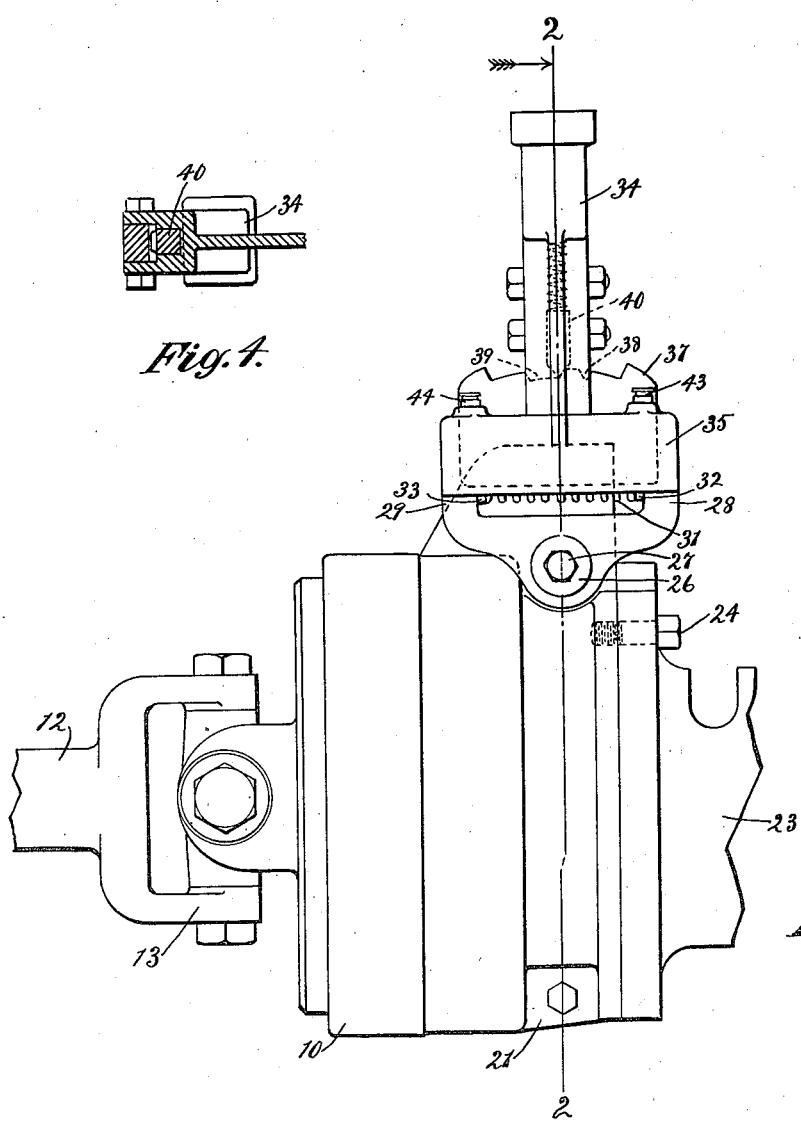

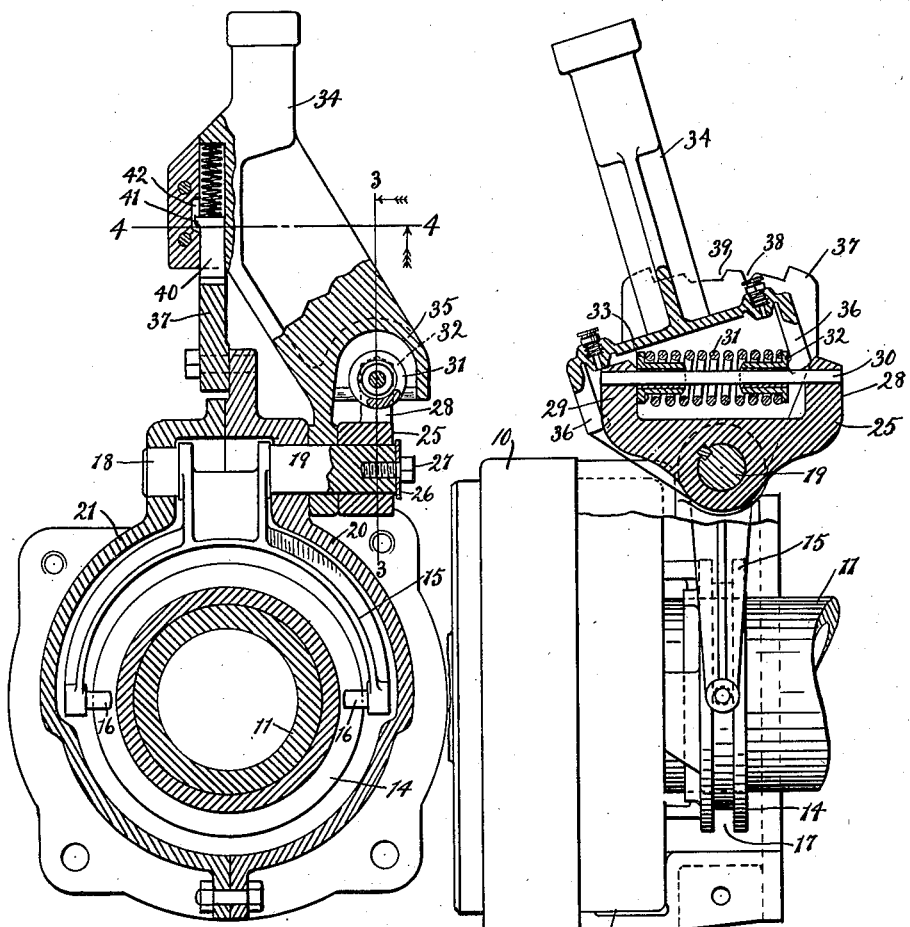

NATHAN M. LOWER, OF PITTSBURGH, PENNSYLVANIA, ASSIGNOR TO LOCOMOTIVE STOKER COMPANY, A CORPORATION OF PENNSYLVANIA.

GEAR-SHIFTING MECHANISM.

1,404,984. Specification of Letters Patent. Patented Jan. 31, 1922.

Application filed August 17, 1920. Serial No. 404,100.

*To all whom it may concern:*

Be it known that I, NATHAN M. LOWER, a citizen of the United States, and resident of Pittsburgh, county of Allegheny, and State of Pennsylvania, have invented certain new and useful Improvements in Gear-Shifting Mechanism, of which the following is a specification, and which are illustrated in the accompanying drawings, forming a part thereof.

This invention relates to means for shifting ratchet drive or the like mechanism, and is especially intended for use with such a drive mechanism for locomotive stoker transfer conveyors as is disclosed in my application for patent on locomotive stoker filed August 1, 1918, Serial No. 247,761.

In the type of stoker there shown it is sometimes desirable to reverse the direction of rotation of the conveyor screw in case some foreign matter jams the screw. Reversing mechanism for the purpose is shown in the application referred to. If it be attempted to reverse such mechanism by means of an unyielding lever while the flights of the conveyor are under heavy pressure applied through the ratchet, there would be great danger of breaking the ratchet reversing mechanism. The objection to the use of an unyielding lever may apply to many forms of clutch mechanisms.

An object of the invention is, therefore, to provide a spring lever mechanism for shifting ratchet or gear controlling mechanism adapted to place a yielding pressure on the collar.

An illustrative embodiment of the invention is shown in the accompanying drawings, in which—

Fig. 1 is a side elevation;

Fig. 2 is partly a transverse section on line 2—2 of Fig. 1 and partly a front elevation;

Fig. 3 is in part a side elevation showing the lever in a different position from that of Fig. 1, and in part a section on line 3—3 of Fig. 2; and Fig. 4 is a transverse section on line 4—4 of Fig. 2, looking in the direction of the arrow.

A casing to house the ratchet or gear mechanism is indicated at 10, a driving shaft at 11, and a driven shaft at 12, the latter preferably driven through a universal joint, as at 13. A collar 14 is shown, which collar is adapted to control the ratchet or gear mechanism by movement longitudinally of shaft 11. This collar may be shifted to three positions, such as neutral, forward drive and reverse.

The collar 14 may be shifted by means of a yoke 15, provided with studs 16 acting on the walls of a groove 17, whereby the collar 14 is at all times free to revolve. The yoke 15 is shown as pivoted on stud shafts 18, 19, journaled in the two halves 20, 21, of a reverse gear cover. The reverse gear cover preferably incloses a portion of the gear casing 10, as at 22. A housing 23 for the shaft 11 may be bolted to the face of the reverse gear cover, as at 24.

To operate the yoke 15 the stud shaft 19 may have a spring-carrying member 25 keyed thereon and retained by a washer 26 and bolt 27. The member 25 has two arms 28, 29, carrying a rod 30, upon which rod there is mounted a spring 31, compressed between thimbles 32, 33. As indicated in Fig. 2, the arms 28, 29, are less in thickness than the diameter of the flanges of the thimbles 32, 33.

To place pressure upon the spring 31 for operation of the yoke 15, a lever 34 may be loosely journaled on stub shaft 19. A box 35 may be formed on lever 34, which box incloses the spring 31 and has slots 36 in its ends wide enough to pass the arms 28, 29, but not the flanges of the thimbles 32, 33. Under these circumstances when the lever 34 is moved in either direction from the central or neutral position shown in Fig. 1, the spring 31 will be compressed, and when the pressure of this spring is sufficient to overcome the resistance to shifting of the collar 14 the mechanism affected by the collar will be operated.

To control the movements of the lever 34, sector 37, having notches 38, 39, may be provided. A spring pressed dog 40, prevented from rotation by a stud 41 traveling in a slot 42, is adapted to coact with the notches in the sector. The dog may be caused to ride out of the notches by pressure on the handle of the lever 34. For application of oil to the rod 30 and thimbles 32, 33, oil cups, as 43, 44, may be provided.

Minor changes in the physical embodiment of the invention may be made without departing from its spirit.

I claim as my invention—

1. A gear shifting mechanism comprising, in combination, a gear controlling collar, a pivoted yoke to move said collar, a pair of spring supporting arms projecting from the pivot of said yoke, a spring mounted between said arms, a lever having a portion standing opposite each end of the spring whereby movement of the lever in either direction from a neutral position will put spring pressure upon said yoke.

2. A gear shifting mechanism comprising, in combination, a gear controlling collar, a pivoted yoke to move said collar, a pair of spring supporting arms projecting from the pivot of said yoke, a spring mounted between said arms, a lever pivoted to swing about an axis in alignment with the axis of the yoke pivot and having a portion standing opposite each end of the spring, whereby movement of the lever in either direction from a neutral position will put spring pressure upon said yoke.

3. A gear shifting mechanism comprising, in combination, a gear controlling collar, a pivoted yoke to move said collar, a pair of spring supporting arms projecting from the pivot of said yoke, a spring mounted between said arms, a lever pivoted upon the pivot of the yoke and having a portion standing opposite each end of the spring, whereby movement of the lever in either direction from a neutral position will put spring pressure upon said yoke.

4. A gear shifting mechanism comprising, in combination, a gear controlling collar, a yoke for shifting said collar, a cover for said parts, said yoke movable about a shaft journaled in said cover, a spring-carrying member keyed to said shaft, a pair of arms projecting from said member, a spring mounted between said arms, a lever loosely mounted on said shaft having a part standing opposite each end of said spring, whereby movement in either direction from a neutral position will place spring pressure on said collar, and means to retain the lever in a position to which it is shifted.

5. A gear shifting mechanism comprising, in combination, a gear controlling collar, a pivoted yoke for shifting the collar, a pair of opposed arms in fixed relation with the yoke, a spring reacting between the arms, and a lever pivoted coaxially with the yoke and having a pair of arms positioned to alternatively engage the opposite ends of the spring.

NATHAN M. LOWER.